United States Patent
Kobayashi et al.

(10) Patent No.: US 7,273,279 B2
(45) Date of Patent: Sep. 25, 2007

(54) PROJECTION DISPLAY APPARATUS

(75) Inventors: Manabu Kobayashi, Saitama (JP); Ryusaku Takahashi, Yokosuka (JP)

(73) Assignee: Victor Company of Japan Limited, Yokohama (JP)

( * ) Notice: Subject to any disclaimer, the term of this patent is extended or adjusted under 35 U.S.C. 154(b) by 274 days.

(21) Appl. No.: 11/116,420

(22) Filed: Apr. 28, 2005

(65) Prior Publication Data

US 2005/0243279 A1    Nov. 3, 2005

(30) Foreign Application Priority Data

Apr. 30, 2004 (JP) ............... P2004-135274
Jun. 30, 2004 (JP) ............... P2004-192923
Mar. 9, 2005 (JP) ............... P2005-065198

(51) Int. Cl.
*G03B 21/14* (2006.01)
*G02F 1/1335* (2006.01)
*H04N 3/26* (2006.01)

(52) U.S. Cl. .............. 353/20; 353/69; 349/9; 348/745

(58) Field of Classification Search .......... 349/57, 349/9; 353/33, 20, 69, 122; 348/745, 757
See application file for complete search history.

(56) References Cited

U.S. PATENT DOCUMENTS

| | | | |
|---|---|---|---|
| 6,678,015 B2* | 1/2004 | Yi et al. | 348/782 |
| 7,036,942 B2* | 5/2006 | Ogawa | 353/122 |
| 7,185,989 B2* | 3/2007 | Fujita et al. | 353/81 |
| 2001/0000971 A1* | 5/2001 | Johnson et al. | 349/117 |
| 2005/0174495 A1* | 8/2005 | Itoh et al. | 348/758 |
| 2006/0238665 A1* | 10/2006 | Stahl et al. | 349/5 |

FOREIGN PATENT DOCUMENTS

JP        2001-174755        6/2001

* cited by examiner

*Primary Examiner*—Andrew T Sever
(74) *Attorney, Agent, or Firm*—The Nath Law Group; Jerald L. Meyer; Stanley N. Protigal

(57) ABSTRACT

A white light emitted from a light source is homogenized by an integrator optical system, transmitted through a color polarizer (113) to be turned into an R light and a G light of a P polarized light, and transmitted through a color polarizer (118) to be turned into a G light of an S polarized light and an R light of a P polarized light. These R light and G light are subjected to light modulation in a reflection type spatial light modulation element for G and a reflection type spatial light modulation element for R arranged at unequal distances from a polarization split surface of a polarizing beam splitter (103), and emitted from a projection lens having an axial chromatic aberration corresponding to the unequal distances.

2 Claims, 4 Drawing Sheets

2. Description of the Related Art

PROJECTION DISPLAY APPARATUS

BACKGROUND OF THE INVENTION

1. Field of the Invention

The present invention relates to a projection display apparatus using reflection type spatial light modulation elements.

2. Description of the Related Art

A color projection display apparatus separates color lights of R (red), G (green) and B (blue) concerning three primary color lights from a white light, leads the separated color lights to spatial light modulation elements for corresponding colors, combines the color lights subjected to light modulation by the spatial light modulation elements in accordance with a video signal, and projects a combined light, thereby displaying a color projected image on a screen.

A scheme using reflection type spatial light modulation elements as a color projection display apparatus is advantageous in an increase in resolution but has a tendency that an optical configuration is complicated. That is because the projection display apparatus to which the reflection type spatial light modulation elements are applied requires polarizing beam splitters in order to separate an incident light, with which the spatial light modulation elements are irradiated, from a reflection light modulated by the spatial light modulation elements. Usually, two or more polarizing beam splitters must be operated with respect to one spatial light modulation element in order to realize high contrast, and this makes the optical configuration of the reflection type projection display apparatus complicated. In order to solve this problem, various configurations have been proposed (see, e.g., Japanese Patent Application Laid-open No. 2001-174755).

Meanwhile, as proposed in Japanese Patent Application Laid-open No. 2001-174755 mentioned above, in order to reduce a size of a color projection display apparatus using reflection type spatial light modulation elements, it is necessary to adopt a configuration in which two spatial light modulation elements are arranged with respect to one polarizing beam splitter in a plurality of polarizing beam splitters to be operated.

Color lights of two colors corresponding to respective color lights enter the polarizing beam splitter for which the two reflection type spatial light modulation elements are arranged in a state where polarization states of the two color lights are different from each other by 90 degrees, and these color lights are separated by a polarization split surface of the polarizing beam splitter. That is, the two color lights which have entered the polarizing beam splitter are separated by transmission or reflection depending on each polarization state, and the separated lights respectively enter the reflection type spatial light modulation elements.

Considering general characteristics of the polarization split surface of this polarizing beam splitter, it is difficult to achieve full transmission, i.e., 100% of transmission, and slight reflection occurs. Now, of two incident color lights, attention is paid to a color light which is transmitted through the polarization split surface of this polarizing beam splitter and caused to enter the corresponding reflection type spatial light modulation element. This color light is transmitted through the polarization split surface, caused to enter the corresponding reflection type spatial light modulation element, and modulated by an image signal corresponding to this color light in this spatial light modulation element, namely, a polarization state of this color light is changed and this color light is reflected.

This reflected modulated light is caused to again enter the polarization split surface, but reflected by the polarization split surface since the polarization state of this light is changed, projected to a polarizing beam splitter which combines color lights, and the combined light is projected onto a screen through a projection lens.

Of the color lights as the object of attention, the light reflected by slight reflection is caused to enter the reflection type spatial light modulation element corresponding to one color light different from the color light to which attention is paid. Although the light reflected by slight reflection is further reflected by this spatial light modulation element and caused to again enter the polarization split surface, but the polarization state of this light is not changed, and this light is transmitted through the polarization split surface, projected to the polarizing beam splitter which combines color lights, and projected onto the screen through the projection lens.

Usually, in the projection display apparatus, in order to uniform focal points of images projected onto the screen with respect to respective color lights, distances from the screen to the respective reflection type spatial light modulation elements are uniformed, and an axial chromatic aberration of the projection lens is set to become minimum with respect to each color light. Therefore, there is a problem that the color light as the object of attention which has been reflected by the reflection type spatial light modulation element corresponding to the color light as the object of attention interferes with the color light as the object of attention which has been reflected by the reflection type spatial light modulation element corresponding to one color light different from the color light as the object of attention on the screen onto which the color lights are projected, resulting in interference fringes.

SUMMARY OF THE INVENTION

The present invention has been developed in view of the above points, and an object of the present invention is to provide a projection display apparatus which can reduce interference fringes of projected images and project an image of high grade.

In order to achieve the above object, there is provided a projection display apparatus (300) comprising: a light source (111) that emits an indefinitely polarized light; first to third reflection type spatial light modulation elements (161, 162, 163) that light-modulate three primary color lights obtained by subjecting the indefinitely polarized light to color separation; first wavelength selective polarization converting means (113) for separating the indefinitely polarized light emitted from the light source (111) into a first color component light having a first polarized wave surface and second and third color component lights having a second polarized wave surface as another polarized wave surface different from the first polarized wave surface by 90 degrees, and emitting the separated color component lights; a first polarization split element (102) that receives a light beam transmitted through the first wavelength selective polarization converting means (113) and divides the light beam into the first color component light and the second and third color component lights; second wavelength selective polarization converting means (118) for receiving the second and third color component lights from the first polarization split element (102) and emitting the second color component light and the third color component light in a state where the polarized wave surface of the second color component light and the polarized wave surface of the third color component light are orthogonal to each other; a second polarization split element (103) that has a polarization split surface (131) that receives the second and third color component lights from the second wavelength selective polarization converting means (118), the polarization split surface (131) transmitting the second color component light therethrough so that the second color component light enters the second reflection type spatial light modulation element (162) set with a first distance from the polarization split surface (131), and reflecting the third color component light so that the third color component light enters the third reflection type spatial light modulation element (161) set with a second distance from the polarization split surface (131), the second distance being different from the first distance; a polarization combining element (105) that receives modulated lights modulated by the first to third reflection type spatial light modulation elements (161, 162, 163), the modulated lights, and emits the combined lights; and a projection lens (130) that has an axial chromatic aberration corresponding to a difference between the first distance and the second distance.

According to the projection display apparatus of the present invention, the reflection type spatial light modulation elements are arranged in such a manner that distances between a screen and the respective reflection type spatial light modulation elements become different from each other, the reflection type spatial light modulation elements having a configuration in which two reflection type spatial light modulation elements are arranged with respect to one polarizing beam splitter, and an axial chromatic aberration of a projection image forming lens is provided in accordance with a difference between the distances. As a result, it is possible to provide the projection display apparatus which can reduce interference fringes of images projected onto the screen and project an image of high grade. In particular, the present invention demonstrates an advantage in an improvement of an image grade of a dark image.

In a preferable embodiment of the present invention, an axial chromatic aberration $\Delta L$ of the projection lens (130) is constituted to have a relationship of 20 $\mu m < \Delta L = |fb1 - fb2| \leq 70$ $\mu m$, in which fb1 is a back focal distance of the projection lens (130) with respect to a central wavelength $\lambda 1$ of the second color component light that enters the second reflection type spatial light modulation element (162), and fb2 is a back focal distance of the projection lens (130) with respect to a central wavelength $\lambda 2$ of the third color component light that enters the third reflection type spatial light modulation element (161).

Furthermore, in order to achieve the above object, there is provided a projection display apparatus (301) comprising: a light source (111) that emits an indefinitely polarized light; first to third reflection type spatial light modulation elements (161, 162, 163) that light-modulate three primary color lights obtained by subjecting the indefinitely polarized light to color separation; first wavelength selective polarization converting means (113) for separating the indefinitely polarized light emitted from the light source (111) into a first color component light having a first polarized wave surface and second and third color component lights having a second polarized wave surface as another polarized wave surface different from the first polarized wave surface by 90 degrees, and emitting the separated color component lights; a first polarization split element (102) that receives a light beam transmitted through the first wavelength selective polarization converting means (113) and divides the light beam into the first color component light and the second and third color component lights; second wavelength selective polarization converting means (118) for receiving the second and third color component lights from the first polarization split element (102) and emitting the second color component light and the third color component light in a state where the polarized wave surface of the second color component light and the polarized wave surface of the third color component light are orthogonal to each other; a second polarization split element (103) that has a polarization split surface (131) that receives the second and third color component lights from the second wavelength selective polarization converting means (118), the polarization split surface (131) transmitting the second color component light therethrough so that the second color component light enters the second reflection type spatial light modulation element (162) set with a first distance from the polarization split surface (131), and reflecting the third color component light so that the third color component light enters the third reflection type spatial light modulation element (161) set with a second distance from the polarized split surface (131), the second distance being different from the first distance; a polarization combining element (105) that receives modulated lights modulated by the first to third reflection type spatial light modulation elements (161, 162, 163), combines the modulated lights, and emits the combined lights; and a light transparent member (126) that has an axial chromatic aberration corresponding to a difference between the first distance and the second distance and that is provided at a next stage of the second polarization split element (103).

According to the projection display apparatus of the present invention, the reflection type spatial light modulation elements are arranged in such a manner that distances between a screen and the respective reflection type spatial light modulation elements become different from each other, the reflection type spatial light modulation elements having a configuration in which the two reflection type spatial light modulation elements are arranged with respect to one polarizing beam splitter, and a light transparent member having an axial chromatic aberration provided thereto in accordance with a difference between the distances is arranged between the polarizing beam splitter and a projection image forming lens system. As a result, it is possible to provide a projection display apparatus which can reduce interference fringes of images projected onto the screen and project an image of high grade. In particular, the present invention demonstrates an advantage in an improvement of an image grade of a dark image.

In another preferable embodiment of the present invention, an axial chromatic aberration $\Delta I$ of the light transparent member (126) is constituted to have a relationship of 20 $\mu m < \Delta I = |t/n1 - t/n2| \leq 70$ $\mu m$, in which t is a thickness of a glass plate constituting the light transparent member (126), n1 is a refractive index with respect to a central wavelength $\lambda 1$ of the second color component light that enters the second reflection type spatial light modulation element (162), and n2 is a refractive index with respect to a central wavelength $\lambda 2$ of the third color component light that enters the third reflection type spatial light modulation element (161).

The nature, principle and utility of the invention will become more apparent from the following detailed description when read in conjunction with the accompanying drawings.

DESCRIPTION OF THE PREFERRED EMBODIMENTS

A best mode for embodying a projection display apparatus according to the present invention will now be described hereinafter based on preferred embodiments.

Embodiment 1

Figure 1:
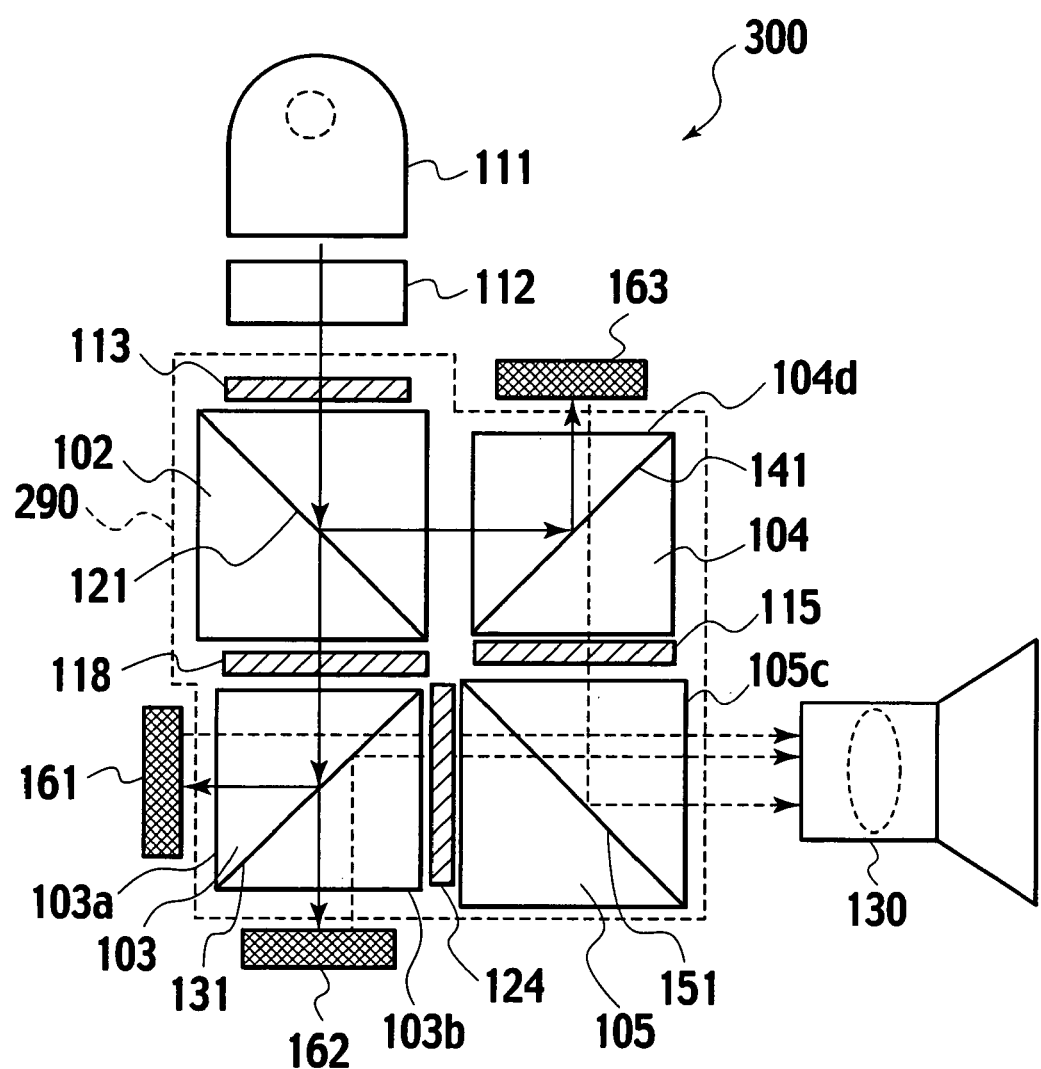
FIG. 1 is a schematic block diagram of an optical system of a projection display apparatus applied to Embodiment 1.

FIG. 1 is a schematic plan view showing an optical configuration of a projection display apparatus applied to Embodiment 1.

In a color separation/combination optical system 290 surrounded by a broken line, first, second and third polarizing beam splitters 102, 103 and 104 which serve as cubic or prismatic polarization split elements and a fourth polarizing beam splitter 105 which serves as a polarization combining element are arranged so that polarization split surfaces 121, 131, 141 and 151 of these polarizing beam splitters form a substantially X-like shape as a whole. Moreover, a color polarizer 113 having a function of rotating polarized wave surfaces of an R light and a G light by 90 degrees is provided on a light transmission surface of the first polarizing beam splitter 102 on an incidence side (an upper surface of the first polarizing beam splitter), and a color polarizer 118 having a function of rotating a polarized wave surface of the G light by 90° is provided between the first and second polarizing beam splitters 102 and 103. Additionally, a color polarizer 124 having a function of rotating a polarized wave surface of the R light by 90° is provided between the second and the fourth polarizing beam splitters 103 and 105, and a color polarizer 115 having a function of rotating a polarized wave surface of a B light by 90° is provided between the third and fourth polarizing beam splitters 104 and 105.

The projection display apparatus 300 applied to Embodiment 1 operates as follows.

Indefinitely polarized white lights emitted from a light source 111 enter an integrator optical system 112. Further, the white lights are homogenized and uniformed as an S polarized light, and this light enters the color polarizer 113. Since the color polarizer 113 is wavelength selective polarization converting means which rotates polarized wave surfaces of the R light and the G light by 90°, the S polarized light concerning the R light and the G light transmitted through the color polarizer 113 is converted into P polarized light. Furthermore, since the color polarizer 113 does not affect the B light at all, the S polarized light remains unchanged with respect to the B light.

A description will now be given as to an optical path and a change in polarized wave surface of each color light.

First, the G light of the P polarized light transmitted through the color polarizer 113 is transmitted straight through the polarization split surface 121 of the first polarizing beam splitter 102, and enters the color polarizer 118. Since the color polarizer 118 is wavelength selective polarization converting means which rotates a polarized wave surface of the G light by 90°, the P polarized light concerning the G light transmitted through the color polarizer 118 is converted into the S polarized light. The G light of the S polarized light transmitted through the color polarizer 118 is caused to enter the second polarizing beam splitter 103, reflected on the polarization split surface 131 of the second polarizing beam splitter 103, exits from a light transmission surface 103a, and enters a reflection type spatial light modulation element 161 for G. Then, the G light is subjected to light modulation corresponding to a video signal for G and reflected in this reflection type spatial light modulation element 161.

A P polarized light component of the G light generated by light modulation is transmitted straight through in the polarization split surface 131 of the second polarizing beam splitter 103, and enters the color polarizer 124. Since the color polarizer 124 is wavelength selective polarization converting means which rotates a polarized wave surface of the R light by 90°, it does not affect the G light at all, and the P polarized light component of the G light is transmitted and advances forward as the P polarized light and enters the fourth polarizing beam splitter 105. Then, the P polarized light component is transmitted straight through a polarization split surface 151 of the fourth polarizing beam splitter 105, and exits from a light transmission surface 105c of the fourth polarizing beam splitter 105.

The R light will now be described. The R light of the P polarized light transmitted through the color polarizer 113 is transmitted straight through the polarization split surface 121 of the first polarizing beam splitter 102, and enters the color polarizer 118. Since the color polarizer 118 is wavelength selective polarization converting means which rotates a polarized wave surface of the G light by 90°, it does not affect the R light at all, and the R light is caused to enter the second polarizing beam splitter 103 as the P polarized light. The R light of the P polarized light caused to enter the second polarizing beam splitter 103 is transmitted straight through the polarization split surface 131 of the second polarizing beam splitter 103, exits from the light transmission surface 103b, and enters a reflection type spatial light modulation element 162 for R. Then, the R light is subjected to light modulation corresponding to a video signal for R and reflected in this reflection type spatial light modulation element 162.

An S polarized light component of the R light generated by light modulation is reflected by the polarization split surface 131 of the second polarizing beam splitter 103, and enters the color polarizer 124. Since this color polarizer 124 is wavelength selective polarization converting means which rotates a polarized wave surface of the R light by 90°, the S polarized light component of the R light is polarized and converted into a P polarized light and enters the fourth polarizing beam splitter 105. Then, this light is transmitted straight through the polarization split surface 151 of the fourth polarizing beam splitter 105, and exits from a light transmission surface 105c of the fourth polarizing beam splitter 105.

The B light will now be described. The color polarizer 113 does not affect the B light at all. Therefore, since the B light remains as the S polarized light, the B light of the S polarized light transmitted through the color polarizer 113 is reflected by the polarization split surface 121 of the first polarizing beam splitter 102, and enters the third polarizing beam splitter 104.

The B light of the S polarized light is reflected by the polarization split surface 141 of the third polarizing beam splitter 104, exits from a light transmission surface 104d, and enters a reflection type spatial light modulation element 163 for B. Furthermore, the B light is subjected to light modulation corresponding to a video signal for B and reflected in this reflection type spatial light modulation element 162.

A P polarized light component of the B light generated by light modulation is transmitted straight through the polarization split surface 141 of the third polarizing beam splitter 104, and enters the color polarizer 115. Since this color polarizer 115 is wavelength selective polarization converting means which rotates a polarized wave surface of the B light by 90° as mentioned above, the P polarized light component of the B light is polarized and converted into an S polarized light, and enters the fourth polarizing beam splitter 105. Then, the this light is reflected by the polarization split surface 151 of the fourth polarization beam splitter 105, and exits from the light transmission surface 105c of the fourth polarizing beam splitter 105.

In this manner, the R light, the G light and the B light exiting from the light transmission surface 105c of the fourth polarizing beam splitter 105 enlarge and display a color image on a non-illustrated screen through a projection lens 130 arranged on a rear stage.

Figure 2:
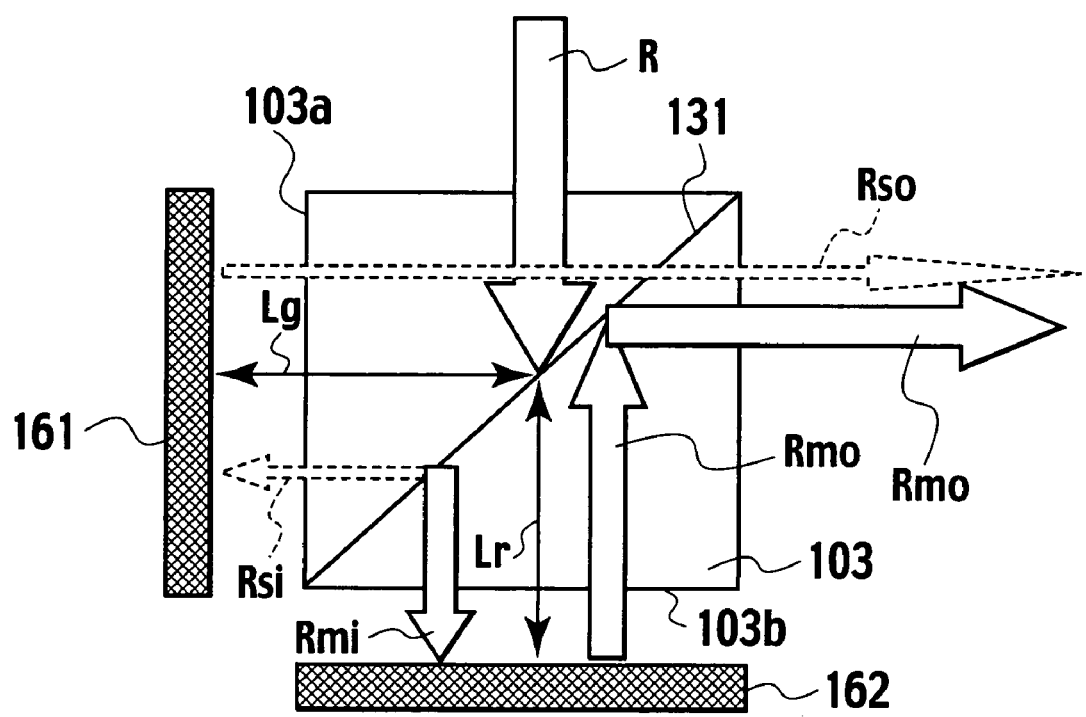
FIG. 2 is a block diagram illustrating an optical system in question in a projection display apparatus applied to each embodiment in detail.

A description will now be given as to generation of interference fringes, which is a problem in a conventional optical system with reference to FIG. 2. This drawing shows a part where the second polarizing beam splitter 103, the reflection type spatial light modulation element 161 for G and the reflection type spatial light modulation element 162 for R are arranged in an enlarged manner. As described in the section about "the description of the related art", there is adopted a structure in which two reflection type spatial light modulation elements are arranged with respect to one polarizing beam splitter, and interference fringes are generated in color lights which are transmitted straight through the polarization split surface of this polarizing beam splitter, light-modulated and reflected by the reflection type spatial light modulation element and reflected by the polarization split surface. Therefore, the R light of the P polarized light which has entered the second polarizing beam splitter 103 is a problem.

Reference symbols R, Rmi, Rmo, Rsi and Rso denote the respective lights in the drawing for the convenience's sake. The R light which enters the second polarizing beam splitter 103 enters as a P polarized light R as described above. Further, this light is transmitted straight through the polarization split surface 131 of the second polarizing beam splitter 103 to be turned into the light Rmi, exits from the light transmission surface 103b, and enters the reflection type spatial light modulation element 162 for the light R.

However, due to generation characteristics of the polarization split surface of the polarizing beam splitter, a part of the incident R light R is reflected by the polarization split surface 131, exits from the light transmission surface 103a of the second polarizing beam splitter 103, and enters the reflection type spatial light modulation element 161 for G as the R light Rsi.

This R light Rsi is reflected by the reflection type spatial light modulation element 161 for G to become the R light Rso. Since the R light Rso is a P polarized light, it is transmitted straight through the polarization split surface 131, and enters the fourth polarizing beam splitter 105. Furthermore, it is transmitted straight through the polarization split surface 151 of the fourth polarizing beam splitter 105, and exits from the light transmission surface 105c of the fourth polarizing beam splitter 105.

On the other hand, the R light Rmi which has been transmitted straight through the polarization split surface 131 of the second polarizing beam splitter 103, exited from the light transmission surface 103b and entered the reflection type spatial light modulation element 162 for R is subjected to light modulation corresponding to a video signal for R and reflected in this reflection type spatial light modulation element 162. An S polarized light component Rmo generated by light modulation is reflected by the polarization split surface 131 of the second polarizing beam splitter 103, and enters the color polarizer 124. The S polarized light component of the R light is polarized and converted into a P polarized light in this color polarizer 124, and enters the fourth polarizing beam splitter 105. Moreover, this light is transmitted straight through the polarization split surface 151 of the fourth polarizing beam splitter 105, and exits from the light transmission surface 105c of the fourth polarizing beam splitter 105.

The R light Rso and the R light Rmo which have exited from the light transmission surface 105c of the fourth polarizing beam splitter 105 interfere with each other on the screen through the projection lens 123, resulting in interference fringes. Such interference fringes become most distinctive in a dark screen in which a level of the R light Rmo is small and the R light Rmo and the R light Rso are equal in level when a distance Lg between the polarization split surface 131 and the reflection type spatial light modulation element 161 for G matches with a distance Lr between the polarization split surface 131 and the reflection type spatial light modulation element 162 for R.

Usually, the projection display apparatus adopts a structure in which distances from the screen to the reflection type spatial light modulation elements for the respective colors become uniform in order to homogenize focal points of images projected onto the screen in accordance with each color light. That is, the distance Lg between the polarization split surface 131 and the reflection type spatial light modulation element 161 for G is matched with the distance Lr between the polarization split surface 131 an the reflection type spatial light modulation element 162 for R.

A description will now be given as to an optical arrangement with which this arrangement relationship is improved and the projection lens 130. The reflection type spatial light modulation element 161 for G and the reflection type spatial light modulation element 162 for R are set at positions by which the distance Lg between the polarization split surface 131 and the reflection type spatial light modulation element 161 for G becomes different from the distance Lr between the polarization split surface 131 and the reflection type spatial light modulation element 162 for R.

However, when the reflection type spatial light modulation element 161 for G and the reflection type spatial light modulation element 162 for R are set at positions by which the distance Lg between the polarization split surface 131 and the reflection type light modulation element 161 for G becomes different from the distance Lr between the polarization split surface 131 and the reflection type spatial light modulation element 162 for R, a focal point of the R light and that of the G light deviate from each other.

Therefore, the reflection type spatial light modulation element 161 for G and the reflection type spatial light modulation element 162 for R are set at positions by which the distance Lr between the polarization split surface 131 and the reflection type spatial light modulation element 162 for R becomes larger than the distance Lg between the polarization split surface 131 and the reflection type spatial light modulation element 161 for G, and an axial chromatic aberration is provided to the projection lens 130 so that an axial chromatic aberration in an R area is large and a focal position in a G area becomes different from a focal position in the R area.

Figure 3A:
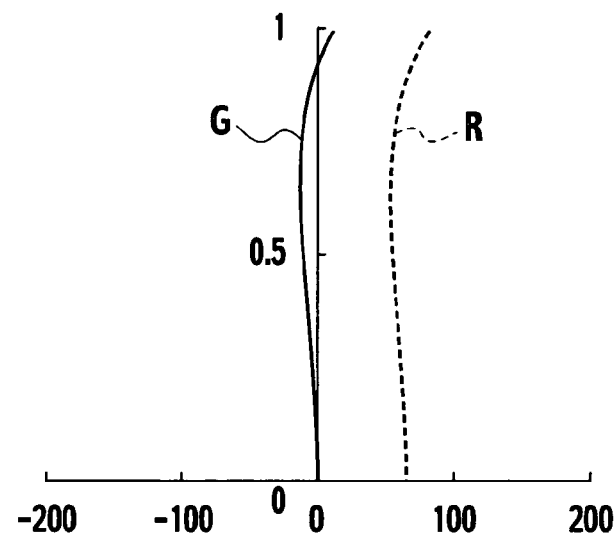
FIGS. 3A and 3B show examples of chromatic aberrations of a projection lens applied to Embodiment 1.
Figure 3B:
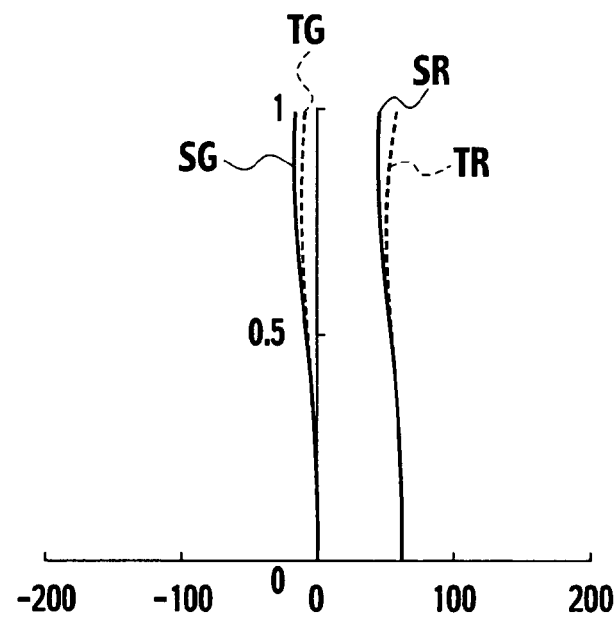

That is, an axial chromatic aberration corresponding to a difference between the distance Lr between the polarization split surface 131 and the reflection type spatial light modulation element 162 for R and the distance Lg between the polarization split surface 131 and the reflection type spatial light modulation element 161 for G is provided to the projection lens 130. FIG. 3A shows an example in which spherical aberration is provided, and FIG. 3B shows an example in which astigmatism is provided. The spherical aberration and the astigmatism shown in FIGS. 3A and 3B represent aberration quantities generated on the incidence side of the projection lens 130 when an image is projected onto the screen. A horizontal axis represents an intensity of the aberration as each aberration quantity, and its unit is μm. A vertical axis in the spherical aberration shown in FIG. 3A represents a height of a light ray which enters the projection lens 130, and a distance from an optical axis (a distance from the center) of the projection lens 130 is expressed with its maximum value being normalized as 1. A vertical axis in the astigmatism shown in FIG. 3B represents a distance from a lens optical axis (a distance from the center) of the projection lens 130 at a position of each reflection type spatial light modulation element arranged at a back focal position of the projection lens 130, and this distance is expressed with its maximum value being normalized as 1.

A value of each of the spherical aberration and the astigmatism shown in FIGS. 3A and 3B at 0 on each vertical axis, namely, on the optical axis of the projection lens 130 is an axial chromatic aberration. Existence of a difference in color between the aberration in the green area and the aberration in the red area means that back focal positions are different, and this difference between the aberrations corresponds to a difference in distance between the back focal position in the green area and the back focal position in the red area. It can be understood from these drawings that the axial chromatic aberration in the red area is large and there is a difference of approximately 67 μm between the focal position in the green area and the focal position in the red area. Therefore, a difference between the distance Lr from the polarization split surface 131 to the reflection type spatial light modulation element 162 for R and the distance Lg from the polarization split surface 131 to the reflection type spatial light modulation element 161 for G is also set to approximately 67 μm.

It is to be noted that G indicates the aberration of a light ray wavelength 0.54607 μm, and R indicates the aberration of a light ray wavelength 0.630 μm. The astigmatism S indicates aberration of a sagittal ray; T, aberration of a tangential ray; SR, aberration of a sagittal ray of the R light; SG, aberration of a sagittal ray of the G light, TR, aberration of a tangential ray of the R light, and TG, aberration of a tangential ray of the G light.

That is, a difference between the distance Lr from the polarization split surface 131 to the reflection type spatial light modulation element 162 for R and the distance Lg from the polarization split surface 131 to the reflection type spatial light modulation element 161 for G corresponds to a difference between a back focal distance of the projection lens 130 with respect to the reflection spatial light modulation element 162 for R and a back focal distance of the projection lens 130 with respect to the reflection type spatial light modulation element 161 for G.

That is because the reflection type spatial light modulation element for each color is placed at a position of a back focal distance of the projection lens 130 when an image is focalized on the screen.

Therefore, assuming that ΔL is an axial chromatic aberration of the projection lens 130, a lower limit value of ΔL, i.e., a lower limit value of a difference between the distance Lg from the polarization split surface 131 to the reflection type spatial light modulation element 161 for G and the distance Lr from the polarization split surface 131 to the reflection type spatial light modulation element 162 for R is a value with which no interference fringe is generated under conditions of a coherence length, and it is a value exceeding 20 μm taking manufacture errors of each polarizing beam splitter and the projection lens 130 into consideration. More preferably, it is desirable to set the lower limit value to a value which is not less than 30 μm.

Assuming that $\lambda_0$ is a central wavelength of a light which generates interference fringes and Δλ is a spread of a spectrum, a coherence length is generally represented as $\lambda_0^2/\Delta\lambda$. Assuming that $\lambda_0=0.6$ μm and Δλ=0.018 μm, $\lambda_0^2/\Delta\lambda=20$ μm is achieved, and it is desirable that the lower limit value is larger than this value.

Additionally, it is good enough to set an upper limit value of ΔL based on conditions of the axial chromatic aberration of the projection lens 130. However, when a white light is divided into or obtained by combining three colors G/B/R, since each color of G/B/R does not correspond to a monochromatic light but a light having a spread of a spectrum, a blur is generated in each color light when the axial chromatic aberration of the projection lens 130 becomes excessive, and hence a desired image formation performance cannot be obtained. Accordingly, the present inventor has obtained a result from an experiment that 70 μm with which the axial chromatic aberration of the projection lens 130 does not become excessive is desirable as the upper limit value of ΔL.

As described above, it is desirable that a value of the axial chromatic aberration of the projection lens 130 is 20 μm to 70 μm, and more preferably, 30 μm to 70 μm.

In this manner, in the projection display apparatus using the reflection type spatial light modulation elements, the reflection type spatial light modulation elements are arranged in such a manner that the two reflection type spatial light modulation elements are arranged with respect to one polarizing beam splitter and distances from the respective reflection type spatial light modulation elements to the screen become different from each other, and the axial chromatic aberration of the projection image forming lens is provided in accordance with a difference between these distances. As a result, a light in the P polarization state can enter the polarizing beam splitter, interference fringes of color lights reflected and projected in the S polarization state can be made indistinctive, and an image grade of a dark image can be greatly improved.

Further, the configuration of the optical system according to Embodiment 1 is the same as the prior art, and it can be realized without adding new components. Furthermore, a change in adjustment method and others are not required.

Embodiment 2

An optical configuration of a projection display apparatus applied to Embodiment 2 will now be described with reference to FIG. 4. This drawing is a schematic plan view showing an optical configuration of a projection display apparatus applied to Embodiment 2, and like reference numerals denote the same configurations as those in Embodiment 1 mentioned above.

Figure 4:
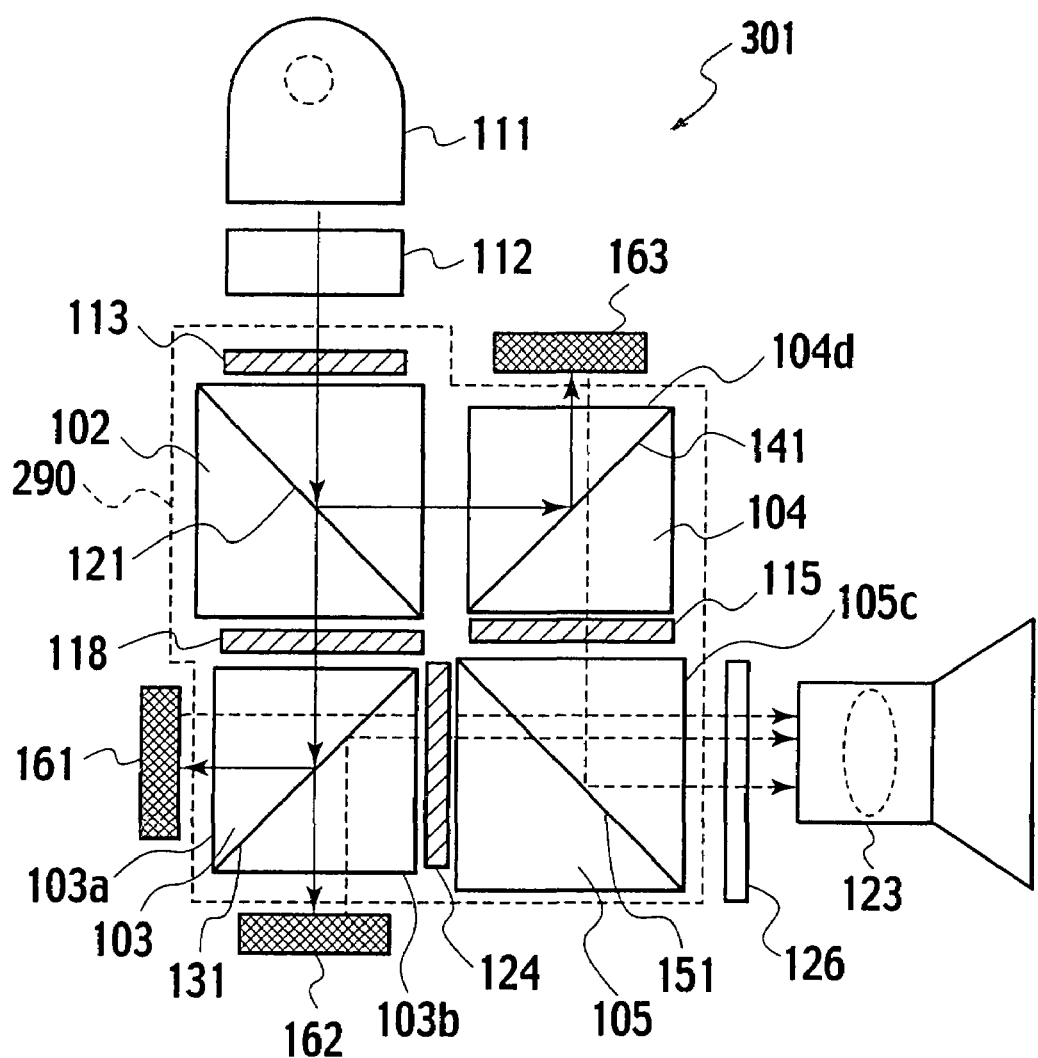
FIG. 4 is a schematic block diagram of an optical system of a projection display apparatus applied to Embodiment 2.

FIG. 4 is a schematic plan view showing the optical configuration of the projection display apparatus applied to Embodiment 2.

A color separation/combination optical system 290 surrounded by a broken line has a structure in which first, second and third polarizing beam splitters 102, 103 and 104 serving as cubic or prismatic polarization split elements and a fourth polarizing beam splitter 105 serving as a polarization combining element are arranged in such a manner that their polarization split surfaces 121, 131, 141 and 151 form a substantially X-like shape as a whole. Furthermore, a color polarizer 113 having a function of rotating polarized wave surfaces of an R light and a G light by 90 degrees is provided to a light transmission surface (an upper surface of the first polarizing beam splitter) of the first polarizing beam splitter 102 on the incidence side, and a color polarizer 118 having a function of rotating a polarized wave surface of a G light by 90° is provided between the first and second polarizing beam splitters 102 and 103. Moreover, a color polarizer 124 having a function of rotating a polarized wave surface of the R light by 90° is provided between the second and the fourth polarizing beam splitters 103 and 105, and a color polarizer 115 having a function of rotating a polarized wave surface of a B light by 90° is provided between the third and fourth polarizing beam splitters 104 and 105.

The projection display apparatus 301 applied to Embodiment 2 operates as follows.

White lights as indefinitely polarized lights emitted from a light source 111 enter an integrator optical system 112. The white lights are homogenized and uniformed as an S polarized light, and this light enters the color polarizer 113. Since the color polarizer 113 is wavelength selective polarization converting means for rotating polarized wave surfaces of the R light and the G light by 90°, the S polarized light concerning the R light and the G light transmitted through the color polarizer 113 is converted into a P polarized light. Further, since the color polarizer 113 does not affect the B light at all, the S polarized light remains unchanged.

An optical path and a change in polarized wave surface of each color light will now be described hereinafter.

First, the G light of the P polarized light transmitted through the color polarizer 113 is transmitted straight through the polarization split surface 121 of the first polarizing beam splitter 102, and enters the color polarizer 118. Since the color polarizer 118 is wavelength selective polarization converting means for rotating a polarized wave surface of the G light by 90°, the P polarized light concerning the G light which is transmitted through the color polarizer 118 is converted into an S polarized light. The G light of the S polarized light transmitted through the color polarizer 118 enters the second polarizing beam splitter 103, is reflected by the polarization split surface 131 of the second polarizing beam splitter 103, exits from the light transmission surface 103a, and enters the reflection type spatial light modulation element 161 for G. Then, this light is subjected to light modulation corresponding to a video signal for G and reflected in this reflection type spatial light modulation element 161.

A P polarized light component of the G light generated by light modulation is transmitted straight through the polarization split surface 131 of the second polarizing beam splitter 103, and enters the color polarizer 124. Since the color polarizer 124 is wavelength selective polarization converting means for rotating a polarized wave surface of the R light by 90°, it does not affect the G light at all, and the P polarized light component of the G light is transmitted and advances forward as the P polarized light, and enters the fourth polarizing beam splitter 105. Further, this light is transmitted straight through the polarization split surface 151 of the fourth polarizing beam splitter 105, and exits from the light transmission surface 105c of the fourth polarizing beam splitter 105.

A description will now be given as to the R light. The R light of the P polarized light transmitted through the color polarizer 113 is transmitted straight through the polarization split surface 121 of the first polarizing beam splitter 102, and enters the color polarizer 118. Since the color polarizer 118 is wavelength selective polarization converting means for rotating a polarized wave surface of the G light by 90°, it does not affect the R light at all, and the R light enters the second polarizing beam splitter 103 as the P polarized light. The R light of the P polarized light which has entered the second polarizing beam splitter 103 is transmitted straight through the polarization split surface 131 of the second polarizing beam splitter 103, exits from the light transmission surface 103b, and enters the reflection type spatial light modulation element 162 for the R light. Furthermore, this light is subjected to light modulation corresponding to a video signal for R and reflected in this reflection type spatial light modulation element 162.

An S polarized light component of the R light generated by light modulation is reflected by the polarization split surface 131 of the second polarizing beam splitter 103, and enters the color polarizer 124. Since this color polarizer 124 is wavelength selective polarization converting means for rotating the polarized wave surface of the R light by 90°, the S polarized light component of the R light is polarized and converted into a P polarized light, and enters the fourth polarizing beam splitter 105. Moreover, this light is transmitted straight through the polarization split surface 151 of the fourth polarizing beam splitter 105, and exits from the light transmission surface 105c of the fourth polarizing beam splitter 105.

A description will now be given as to the B light. Since the color polarizer 113 does not affect the B light at all, the B light remains as an S polarized light. Therefore, the B light of the S polarized light transmitted through the color polarizer 113 is reflected by the polarization split surface 121 of the first polarizing beam splitter 102, and enters the third polarizing beam splitter 104.

The B light of the S polarized light is reflected by the polarization split surface 141 of the third beam splitter 104, exits from the light transmission surface 104d, and enters the reflection type spatial light modulation element 163 for B. Then, this light is subjected to light modulation corresponding to a video signal for B and reflected in this reflection type spatial light modulation element 162.

A P polarized light component of the B light generated by light modulation is transmitted straight through the polarization split surface 141 of the third polarization beam splitter 104, and enters the color polarizer 115. This color polarizer 115 is wavelength selective polarization converting means for rotating the polarized wave surface of the B light by 90°, the P polarized light component of the B light is polarized and converted into an S polarized light, and enters the fourth polarizing beam splitter 105. This light is reflected by the polarization split surface 151 of the fourth polarizing beam splitter 105, and exits from the light transmission surface 150c of the fourth polarizing beam splitter 105.

In this manner, the R light, the G light and the B light which have exited from the light transmission surface 105c of the fourth polarizing beam splitter 105 enlarge and display a color image on a non-illustrated screen through a projection lens 123 arranged on a rear stage.

The principle of occurrence of interference fringes, which was a problem in a conventional optical system, is as described above in conjunction with FIG. 2.

In Embodiment 2, as shown in FIG. 4, the reflection type spatial light modulation element 161 for G and the reflection type spatial light modulation element 162 for R are set at positions by which the distance Lr from the polarization split surface 131 to the reflection type spatial light modulation element 162 for R becomes larger than the distance Lg from the polarization split surface 131 to the reflection type spatial light modulation element 161 for G, and the chromatic aberration plate 126 having the axial chromatic aberration in the R area corresponding to a difference between the distance Lr and the distance Lg is set in a gap between the light transmission surface 105c of the fourth polarizing beam splitter 105 and the projection lens 123. However, these differences must be set in such a manner that an image on the screen is not defocused, and Table 1 shows an example of the chromatic aberration plate 126. Here, it should be noted that the "chromatic aberration plate" means a "light transparent member" provided with an axial chromatic aberration corresponding to a difference between a first distance and a second distance using dispersion thereof and the dispersion means a difference in refractive index of a member (optical glass) dependent upon color (wavelength of light).

TABLE 1

| Glass | | Glass, Example 1 | Glass, Example 2 | Glass, Example 3 |
|---|---|---|---|---|
| nd | | 1.80518 | 1.717 | 1.51633 |
| vd | | 25.4 | 47.9 | 64.1 |
| t (mm) | | 10 | 20 | 30 |
| n1 | λ = 0.546047 μm | 1.81264 | 1.72056 | 1.51825 |
| n2 | λ = 0.65627 μm | 1.79611 | 1.71253 | 1.51386 |
| ΔI (mm) | | 0.051 | 0.055 | 0.057 |

Numeric values in Table 1 are as follows:

Axial chromatic aberration of the chromatic aberration plate: $\Delta I = |t/n1 - t/n2|$;

nd: a refractive index of a glass substrate used for the chromatic aberration plate 126;

vd: an Abbe number of the glass substrate used for the chromatic aberration plate 126;

t: a thickness of the glass substrate used for the chromatic aberration plate 126;

n1: a refractive index in case of a central wavelength λ1 corresponding to the second reflection type liquid crystal element 162; and n2: a refractive index in case of a central wavelength λ2 corresponding to the third reflection type liquid crystal element 163.

Examples 1 to 3 shown in Table 1 indicate that the axial chromatic aberration in the red area is large and there are differences of approximately 51 μm, approximately 55 μm and approximately 57 μm between a back focal position in the green area and a back focal position in the red area. Therefore, it is good enough to set a difference between the distance Lr from the polarization split surface 131 to the reflection type spatial light modulation element 162 for R and the distance Lg from the polarization split surface 131 to the reflection type spatial light modulation element for G to approximately 51 μm, approximately 55 μm and approximately 57 μm.

That is, the difference between the distance Lr from the polarization split surface 131 to the reflection type spatial light modulation element 162 for R and the distance Lg from the polarization split surface 131 to the reflection type spatial light modulation element 161 for G corresponds to a difference between a back focal distance of the projection lens 123 with respect to the reflection type spatial light modulation element 162 for R and a back focal distance of the projection lens 123 with respect to the reflection type spatial light modulation element 161 for G.

That is because the reflection type spatial light modulation element for each color is placed at a position of the back focal distance of the projection lens 130 when an image is focused on the screen.

Therefore, assuming that ΔI is an axial chromatic aberration of the chromatic aberration plate, a lower limit value of ΔI, i.e., a lower limit value of the difference between the distance Lg from the polarization split surface 131 to the reflection type spatial light modulation element 161 for G and the distance Lr from the polarization split surface 131 to the reflection type spatial light modulation element 162 for R is set as a value with which no interference fringes are not generated based on the conditions of a coherence length, and as a value which exceeds 20 μm taking manufacture errors of each polarizing beam splitter and the chromatic aberration plate 126 into consideration. More preferably, it is desirable to set this lower limit value as a value which is not less than 30 μm.

Assuming that $\lambda_0$ is a central wavelength of a light which generates interference fringes and Δλ is a spread of a spectrum, the coherence length is generally expressed as $\lambda_0^2/\Delta\lambda$. Assuming that $\lambda_0 = 0.6$ μm and Δλ=0.018 λm, $\lambda_0^2/\Delta\lambda = 20$ μm is achieved, and it is desirable that the coherence length is larger than this value.

Further, it is good enough to set the upper limit value of ΔI based on the conditions of the axial chromatic aberration of the chromatic aberration plate 126. However, when a white light is divided into or obtained by combining three colors of G/B/R, each color of G/B/R does not correspond to a monochromatic light but a light which has more or less a spread of a spectrum. Therefore, when the axial chromatic aberration of the chromatic aberration plate 126 becomes excessive, a blur is generated in each color light, and a desired image formation performance cannot be obtained. Accordingly, the present inventor has obtained from an experiment a result that 70 μm with which the axial chromatic aberration of the chromatic aberration plate 126 does not become excessive is desirable for the upper limit value of ΔL.

As described above, it is desirable for a value of the axial chromatic aberration of the chromatic aberration plate 126 to be 20 μm to 70 μm, and more preferably, 30 μm to 70 μm.

In this manner, in the projection display apparatus using the reflection spatial light modulation elements, the reflection type spatial light modulation elements are arranged so that distances between the respective reflection type spatial light modulation elements and the screen become different from each other, the reflection type spatial light modulation elements being configured in such a manner that the two reflection type spatial light modulation elements are arranged with respect to one polarizing beam splitter, and the chromatic aberration plate is provided in accordance with a difference between the distances. As a result, a light can enter the polarizing beam splitter in a P polarized light state, interference fringes of a color light reflected and projected in an S polarized light state can be made indistinctive, and an image grade of a dark image can be considerably improved.

It is to be noted the chromatic aberration plate is provided in the above description, but a desired axial chromatic aberration may be provided by using the polarizing beam splitter arranged between the projection lens and the reflection type spatial light modulation element corresponding to a color light by which interference fringes are generated, or axial chromatic aberrations of the polarizing beam splitter and the chromatic aberration plate may be added up to obtain a desired axial chromatic aberration.

Furthermore, since the configuration of an optical system according to Embodiment 2 can be realized by adding the chromatic aberration plate to the same configuration as the prior art, it is possible to realize a projection display apparatus which can project an image of high grade without requiring a change in configuration of the optical system, a change in adjustment method and others.

Although the interference fringes of the red light has been described based on the color arrangement of the optical system in the structural example in conjunction with each of the foregoing embodiments, the projection display apparatus using the reflection type spatial light modulation elements may be constituted in such a manner that the two reflection type spatial light modulation elements are arranged with respect to one polarizing beam splitter so that interference fringes of a blue light or a green light can be reduced since this is a problem which can occur with a color light which enters the polarizing beam splitter in a P polarized light state, and is reflected and exits in an S polarized light state.

Moreover, the two color lights in the white light emitted from the light source are transmitted straight through the polarizing beam splitter to enter another polarizing beam splitter, the former polarizing beam splitter being arranged on a preceding stage of the latter polarizing beam splitter for which the two reflection type spatial light modulation elements are arranged in the description of each of the foregoing embodiments, but these color lights may be reflected by the polarizing beam splitter arranged on the preceding stage to enter the latter polarizing beam splitter.

It should be understood that many modifications and adaptations of the invention will become apparent to those skilled in the art and it is intended to encompass such obvious modifications and changes in the scope of the claims appended hereto.

What is claimed is:

1. A projection display apparatus comprising:
a light source which emits an indefinitely polarized light;
first to third reflection type spatial light modulation elements that light-modulate three primary color lights obtained by subjecting the indefinitely polarized light to color separation;
first wavelength selective polarization converting means for separating the indefinitely polarized light emitted from the light source into a first color component light having a first polarized wave surface and second and third color component lights having a second polarized wave surface as another polarized wave surface different from the first polarized wave surface by 90 degrees, and emitting the separated color component lights;
a first polarization split element that receives a light beam transmitted through the first wavelength selective polarization converting means and divides the light beam into the first color component light and the second and third color component lights;
second wavelength selective polarization converting means for receiving the second and third color component lights from the first polarization split element and emitting the second color component light and the third color component light in a state where the polarized wave surface of the second color component light and the polarized wave surface of the third color component light are orthogonal to each other;
a second polarization split element that has a polarization split surface that receives the second and third color component lights from the second wavelength selective polarization converting means, the polarization split surface transmitting the second color component light therethrough so that the second color component light enters the second reflection type spatial light modulation element set with a first distance from the polarization split surface, and reflecting the third color component light so that the third color component light enters the third reflection type spatial light modulation element set with a second distance from the polarization split surface, the second distance being different from the first distance;
a polarization combining element that receives modulated lights modulated by the first to third reflection type spatial light modulation elements, combines the modulated lights and emits the combined lights; and
a projection lens that has an axial chromatic aberration corresponding to a difference between the first distance and the second distance, wherein
an axial chromatic aberration $\Delta L$ of the projection lens is constituted to have a relationship of 20 μm $<\Delta L=|fb1-fb2|\leq 70$ μm, in which fb1 is a back focal distance of the projection lens with respect to a central wavelength $\lambda 1$ of the second color component light that enters the second reflection type spatial light modulation element, and fb2 is a back focal distance of the projection lens with respect to a central wavelength $\lambda 2$ of the third color component light that enters the third reflection type spatial light modulation element.

2. A projection display apparatus comprising:
a light source that emits an indefinitely polarized light;
first to third reflection type spatial light modulation elements that light-modulate three primary color lights obtained by subjecting the indefinitely polarized light to color separation;
first wavelength selective polarization converting means for separating the indefinitely polarized light emitted from the light source into a first color component light having a first polarized wave surface and second and third color component lights having a second polarized wave surface as another polarized wave surface different from the first polarized wave surface by 90 degrees, and emitting the separated color component lights;
a first polarization split element that receives a light beam transmitted through the first wavelength selective polarization converting means and divides the light beam into the first color component light and the second and third color component lights;
second wavelength selective polarization converting means for receiving the second and third color component lights from the first polarization split element and emitting the second color component light and the third color component light in a state where the polarized wave surface of the second color component light and the polarized wave surface of the third color component light are orthogonal to each other;

a second polarization split element that has a polarization split surface that receives the second and third color component lights from the second wavelength selective polarization converting means, the polarization split surface transmitting the second color component light therethrough so that the second color component light enters the second reflection type spatial light modulation element set with a first distance from the polarization split surface, and reflecting the third color component light so that the third color component light enters the third reflection type spatial light modulation element set with a second distance from the polarized split surface, the second distance being different from the first distance;

a polarization combining element that receives modulated lights modulated by the first to third reflection type spatial light modulation elements, combines the modulated lights, and emits the combined lights; and a light transparent member that has an axial chromatic aberration corresponding to a difference between the first distance and the second distance and that is provided at a next stage of the second polarization split element, wherein an axial chromatic aberration $\Delta I$ of the light transparent member is constituted to have a relationship of 20 $\mu m < \Delta I = |t/n1 - t/n2| \leq 70$ $\mu m$, in which t is a thickness of a glass plate constituting the light transparent member, n1 is a refractive index with respect to a central wavelength $\lambda 1$ of the second color component light that enters the second reflection type spatial light modulation element, and n2 is a refractive index with respect to a central wavelength $\lambda 2$ of the third color component light that enters the third reflection type spatial light modulation element.

* * * * *